US006008330A

United States Patent [19]

Kunde

[11] Patent Number: 6,008,330

[45] Date of Patent: Dec. 28, 1999

[54] PROCESS FOR THE PREPARATION OF AMINODIARYLAZO COMPOUNDS

[75] Inventor: Klaus Kunde, Neunkirchen-Seelscheid, Germany

[73] Assignee: Bayer Aktiengesellschaft, Leverkusen, Germany

[21] Appl. No.: 09/247,365

[22] Filed: Feb. 10, 1999

[30] Foreign Application Priority Data

Feb. 18, 1998 [DE] Germany ........................... 198 06 744

[51] Int. Cl.[6] .................................................... C09B 43/08

[52] U.S. Cl. ........................... 534/600; 534/829; 534/835

[58] Field of Search .................................... 534/600, 829, 534/835

[56] References Cited

U.S. PATENT DOCUMENTS

| | | | |
|---|---|---|---|
| 1,408,405 | 2/1922 | Schoner et al. | 534/600 |
| 1,873,606 | 8/1932 | Lange et al. | 534/835 |
| 2,092,143 | 9/1937 | Schweitzer | 534/600 |
| 4,002,607 | 1/1977 | McLeod | 534/600 X |
| 4,591,634 | 5/1986 | Herd et al. | 534/570 |
| 5,663,309 | 9/1997 | Hurter | 534/835 X |
| 5,808,016 | 9/1998 | Kunde | 534/835 X |

FOREIGN PATENT DOCUMENTS

| | | | |
|---|---|---|---|
| 694965 | 8/1949 | Germany . | |
| 2656781 | 6/1978 | Germany | 534/600 |
| 8270 | of 1893 | United Kingdom | 534/600 |
| 27861 | of 1911 | United Kingdom | 534/600 |
| 251266 | 6/1926 | United Kingdom | 534/600 |
| 297884 | 10/1928 | United Kingdom | 534/600 |
| 491551 | 9/1938 | United Kingdom | 534/600 |

OTHER PUBLICATIONS

Smith, P.A.S., "Open–Chain Nitrogen Compounds", vol. II, 1966, W.A. Benjamin, Inc., New York, 422–423.

*Primary Examiner*—Fiona T. Powers
*Attorney, Agent, or Firm*—Joseph C. Gil; Richard E.L. Henderson

[57] ABSTRACT

The present invention relates to a novel process for the preparation of aminodiarylazo compounds by reducing nitrodiarylazo compounds using 1,2-alkanediols or 1,2-aminoalkanols.

5 Claims, No Drawings

PROCESS FOR THE PREPARATION OF AMINODIARYLAZO COMPOUNDS

BACKGROUND OF THE INVENTION

The present invention relates to a novel process for the preparation of aminodiarylazo compounds by reducing nitrodiarylazo compounds using 1,2-alkanediols or 1,2-aminoalkanols. The novel process is particularly environmentally compatible and gives the desired compounds in good yields.

It is known that nitrodiarylazo compounds can be converted into the corresponding trisazo- or disazoazoxy compounds by treating them with sugars, such as glucose. Cf. German Patent Application DE-A 694,965. Surprisingly, it has now been found that substituted nitrodiarylazo compounds can react in a certain way with 1,2-alkanediols or 1,2-aminoalkanols to give the corresponding aminodiarylazo compounds.

SUMMARY OF THE INVENTION

The present invention provides a process for the preparation of aminodiarylazo compounds of the general formula (I)

(I)

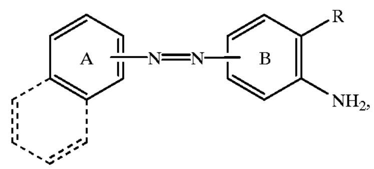

in which

A is a phenyl or naphthyl ring or a phenyl or naphthyl ring substituted by one or more radicals customary in azo dye chemistry, B is a phenyl ring or a phenyl ring substituted by one or more radicals customary in azo dye chemistry, and R is a radical of the formula $SO_3H$, COOH, $C_1$–$C_4$-alkyl, or $C_1$–$C_4$-alkoxy, comprising reducing corresponding nitrodiarylazo compounds of formula (II)

(II)

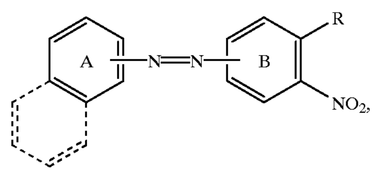

in which A, B, and R are as defined for formula (I), with at least one compound selected from group consisting of optionally substituted 1,2-alkanediols and optionally substituted 1,2-aminoalkanols.

DETAILED DESCRIPTION OF THE INVENTION

The aminodiarylazo compounds are preferably compounds of the formula (I) in which A can be substituted by one or more of the following radicals: $SO_3H$, COOH, $C_1$–$C_4$-alkyl, $C_1$–$C_4$-alkoxy, OH, $NH_2$, mono- and di-($C_1$–$C_4$-alkyl)amino, 2-hydroxyethylamino, sulfato-$C_1$–$C_2$-alkylamino, $CF_3$, F, Cl, Br, acetylamino, maleylamino, benzoylamino, and arylazo and in which B can be further substituted by one or more of the following radicals: $SO_3H$, COOH, $C_1$–$C_4$-alkyl, $C_1$–$C_4$-alkoxy.

Examples of the arylazo radicals specified as substituents for ring A are phenylazo and naphthylazo, each of which is optionally further substituted by one or more radicals, such as $SO_3H$, COOH, $CH_3$, $C_2H_5$, $OCH_3$, $OC_2H_5$, OH, $NH_2$, $NHCH_3$, $NHC_2H_4OH$, $CF_3$, F, Cl, Br, $NHCOCH_3$, $NHCOC_2H_2COOH$, and $NHCOC_6H_5$.

Particular preference is given to using the process according to the invention for the preparation of aminodiarylazo compounds of the formula (III)

(III)

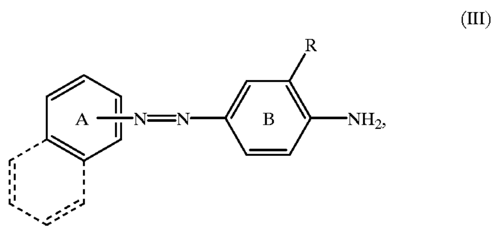

in which A, B and R are as defined for formula (I), by reacting the corresponding nitrodiarylazo compounds of the formula (III*a*)

(IIIa)

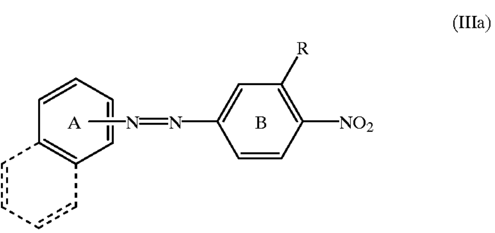

in which A, B, and R are as defined for formula (I), with the specified reducing agents used according to the invention.

Suitable substituents for the optionally substituted 1,2-alkanediols and the optionally substituted 1,2-aminoalkanols are $—CH_3$, $—CH_2OH$, —CHO, $—C_2H_4OH$, $—CH(OH)CH_2OH$, $—CH(OH)CH(OH)CH_2OH$, and $—COCH_2OH$.

Examples of reducing agents which can be used according to the invention are ethylene glycol, glycerol, 2-aminoethanol, diethanolamine, triethanolamine, glyceraldehyde, threose, erythrose, erythritol, arabinose, ribose, xylose, glucose, mannose, galactose, sorbitol, mannitol, glucosamine, and galactosamine. Particularly preferred reducing agents are aldotrioses, aldotetroses, aldopentoses, aldohexoses, and aldoheptoses. A particularly advantageous reducing agent has been found to be glucose. The reducing agents according to the invention can be used individually or in any mixture with one another.

The reduction is generally carried out in an aqueous or aqueous-organic medium, preferably in water in an alkaline medium (preferably at a pH between 8 and 12), at temperatures between 30° and 105° C. (preferably between 50° and 100° C.).

Examples of suitable bases are the hydroxides of the alkali metals or alkaline earth metals, as well as alkali metal carbonates, such as, for example, LiOH, NaOH, KOH, $Ca(OH)_2$, $Li_2CO_3$, $Na_2CO_3$, and $K_2CO_3$.

The proportion of organic reaction medium is optionally from 0 to 99% (preferably from 0 to 10%) when the nitrodiarylazo compound (III*a*) to be reduced contains at least one $SO_3H$ or COOH group and preferably from 50 to 95% when such groups are not present. The organic solvent is preferably a $C_1$–$C_6$-alkanol, alkanediol, $C_4$–$C_6$-lactam or $C_2$–$C_6$-sulfone. Such solvents are, for example, methanol, ethanol, n-propanol, isopropanol, n-butanol, N-methylpyrrolidone, ε-caprolactam, and sulfolane.

Aminodiarylazo compounds have been known as dyes or dye intermediates for some time. A common preparative process is the selective reduction of nitrodiarylazo compounds using sulfide or hydrogen sulfide ions (cf., for example, *BIOS Final Report* 1548, pp. 107, 109, and 128), but there is a constant risk that hydrogen sulfide, a very toxic gas, could form and escape. In the process according to the present invention, this danger does not exist.

In the process according to the invention, the sulfide or hydrogen sulfide ions used according to the prior art are replaced by the reducing agents according to the invention. Depending on the nitrodiarylazo compounds to be reduced and the parameters of temperature and pH, from 1 to 7 mol of reducing agent are used per mole of nitrodiarylazo compound. The order in which the reactants are added to the reaction medium is, in principle, arbitrary. In a preferred variant, the nitrodiarylazo compound to be reduced is first dissolved or suspended in the reaction medium. After this mixture has been heated to the reaction temperature, the required pH is established and the reducing agent of the formula (I) is then added. During this time, the pH and the temperature are, if necessary, kept constant using suitable measures.

The progress of the reduction is monitored using methods customary in azo dye chemistry, such as thin-layer chromatography.

When the reduction is complete, the aminodiarylazo compound is isolated using one of the procedures customary in azo dye chemistry, such as precipitation using a salt (e.g., NaCl or KCl) and/or by changing the pH using acids or alkalis, after which the reduction product collected by filtration. It is also possible to remove the reaction medium by evaporation or spray-drying.

The chemical yields for the reduction according to the invention are equally as good as for the conventional reduction using sulfide or hydrogen sulfide ions.

Another advantage of the process according to the invention is that, in contrast to the sulfide ion reduction, the process according to the invention gives products which are free from colloidal sulfur. Consequently, the otherwise necessary treatment to remove this sulfur is not required.

Using other reducing agents, this selective reduction can only be carried out with low yields, if at all.

The nitrodiarylazo compounds to be reduced are obtained, for example, by coupling the diazonium compounds of nitroaminobenzene or their derivatives substituted by one or more of the above-mentioned radicals with coupling components from the series consisting of naphthalenes or benzenes substituted by one or more of the above-mentioned radicals.

Examples of suitable nitrodiarylazo compounds (II) are (IIa)

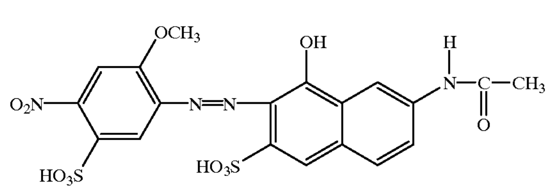

-continued (IIb)

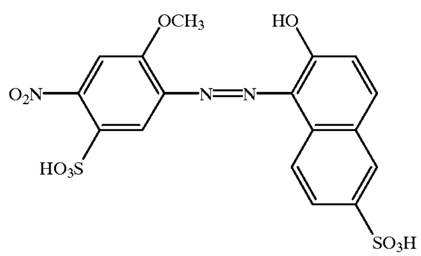

(IIc)

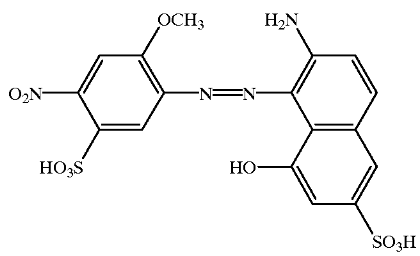

(IId)

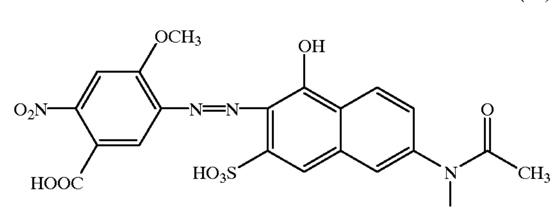

(IIe)

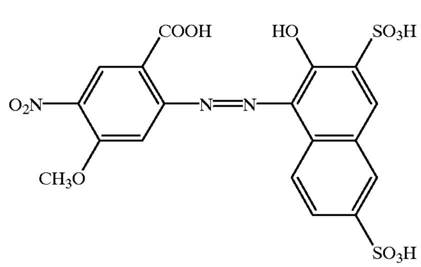

(IIf)

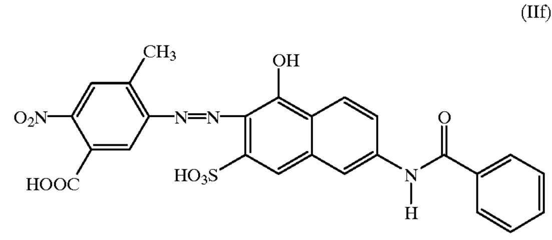

(IIg)

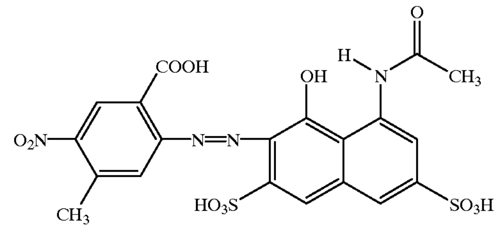

The following example further illustrates details for the process of this invention. The invention, which is set forth in the foregoing disclosure, is not to be limited either in spirit or scope by this example. Those skilled in the art will readily understand that known variations of the conditions of the following procedure can be used. Unless otherwise noted, all temperatures are degrees Celsius and all percentages are percentages by weight.

EXAMPLE 54 g of the compound of formula (II*a*) in the form of the sodium salt are suspended in 1000 ml of water at 80° C., and 15 g of sodium hydroxide and 45 g of glucose are added. When the reduction is complete, the aminoazo compound of the following formula is collected by filtration:

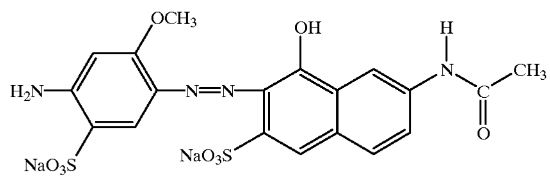

What is claimed is:

1. A process for the preparation of aminodiarylazo compounds of formula (I)

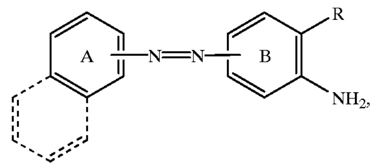

wherein

A is a phenyl or naphthyl ring or a phenyl or naphthyl ring substituted by one or more radicals customary in azo dye chemistry, B is a phenyl ring or a phenyl ring substituted by one or more radicals customary in azo dye chemistry, and R is a radical of the formula $SO_3H$, COOH, $C_1$–$C_4$-alkyl, or $C_1$–$C_4$-alkoxy, comprising reducing a corresponding nitrodiarylazo compound of formula (II)

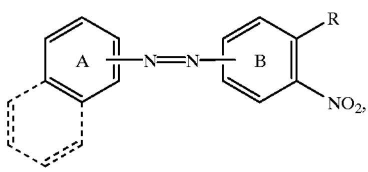

wherein A, B, and R are as defined for formula (I), with at least one compound selected from group consisting of optionally substituted 1,2-alkanediols and optionally substituted 1,2-aminoalkanols in an aqueous or aqueous-organic medium at a pH between 8 and 12 and at a temperature between 30° C. and 105° C.

2. A process according to claim 1 wherein the nitrodiarylazo compound is a compound having the formula (III*a*)

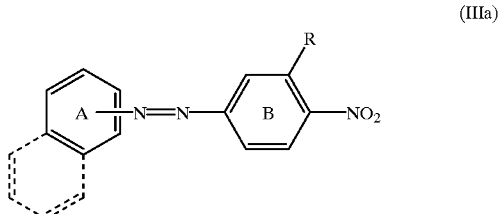

wherein

A is a phenyl or naphthyl ring or a phenyl or naphthyl ring substituted by one or more radicals customary in azo dye chemistry, B is a phenyl ring or a phenyl ring substituted by one or more radicals customary in azo dye chemistry, and R is a radical of the formula $SO_3H$, COOH, $C_1$–$C_4$-alkyl, or $C_1$–$C_4$-alkoxy.

3. A process according to claim 1 wherein the reducing agent is at least one compound selected from group consisting of ethylene glycol, glycerol, 2-aminoethanol, diethanolamine, triethanolamine, glyceraldehyde, threose, erythrose, erythritol, arabinose, ribose, xylose, glucose, mannose, galactose, sorbitol, mannitol, glucosamine, and galactosamine.

4. A process according to claim 1 wherein the reducing agent is a compound selected from group consisting of aldotriose, aldotetrose, aldopentose, aldohexose, and aldoheptose.

5. A process according to claim 1 wherein the reducing agent is glucose.

* * * * *